US008807535B2

(12) United States Patent
Stelzer et al.

(10) Patent No.: US 8,807,535 B2
(45) Date of Patent: Aug. 19, 2014

(54) ROCKFALL PROTECTION SYSTEM

(75) Inventors: Gernot Stelzer, Kuchl (AT); Ahren Bichler, Vancouver (CA)

(73) Assignee: Trumer Schutzbauten GesmbH, Oberndorf (AT)

( * ) Notice: Subject to any disclaimer, the term of this patent is extended or adjusted under 35 U.S.C. 154(b) by 0 days.

(21) Appl. No.: 13/399,784

(22) Filed: Feb. 17, 2012

(65) Prior Publication Data

US 2012/0211712 A1 Aug. 23, 2012

(30) Foreign Application Priority Data

Feb. 17, 2011 (EP) .................................... 11001312

(51) Int. Cl.
*E01F 7/02* (2006.01)
(52) U.S. Cl.
USPC .......................................... 256/12.5; 256/35
(58) Field of Classification Search
USPC .............. 256/12.5, 30, 31, 36, 35; 405/259.1, 405/302.4, 302.6, 302.7; 52/158
See application file for complete search history.

(56) References Cited

U.S. PATENT DOCUMENTS

| | | |
|---|---|---|
| 142,450 A | 9/1873 | Edge |
| 256,987 A | 4/1882 | Dodge et al. |
| 448,455 A | 3/1891 | Randall |
| 577,906 A | 3/1897 | Wohlgemuth |
| D29,160 S | 8/1898 | Henley |
| 750,903 A | 2/1904 | Shrum et al. |
| 769,180 A | 9/1904 | Parrish |
| 929,502 A | 7/1909 | Scott |
| 2,063,052 A * | 12/1936 | Robins ............................ 52/158 |
| 2,351,449 A * | 6/1944 | Noble ............................. 52/158 |
| 2,390,200 A | 12/1945 | York |
| 2,870,884 A * | 1/1959 | Mazur ............................ 52/158 |
| 3,473,652 A | 10/1969 | Verstraete |
| 5,395,105 A * | 3/1995 | Thommen, Jr. ............. 256/12.5 |
| 5,413,148 A | 5/1995 | Mintz et al. |

(Continued)

FOREIGN PATENT DOCUMENTS

| | | |
|---|---|---|
| AT | 271855 B | 6/1969 |
| CH | 376459 A | 4/1964 |

(Continued)

OTHER PUBLICATIONS

Machine Translation of CH-677376-A5 (obtained Sep. 5, 2012 from espacenet).*

(Continued)

*Primary Examiner* — Michael P Ferguson
(74) *Attorney, Agent, or Firm* — Kolisch Hartwell, P.C.

(57) ABSTRACT

A rockfall protection system may include a plurality of supports that each have a support head, along with a catch net, an upper support cable guiding an upper edge of the catch net at the support heads, and an upper central cable and a lower central cable guiding the catch net in a central support area of the supports. The lower central cable may be tensioned using side anchors provided with at least one braking element. The system may also include a lower support cable guiding a lower edge of the catch net and being guided together with the lower edge of the catch net on the downhill side of and separated from the supports. The braking element may be connected to the side anchor and to the central cable by a cable loop. The side anchor and central cable may be connected via a predetermined breaking point.

22 Claims, 3 Drawing Sheets

(56) References Cited

U.S. PATENT DOCUMENTS

| | | | | |
|---|---|---|---|---|
| 5,435,524 A | * | 7/1995 | Ingram | 256/12.5 |
| 5,515,656 A | * | 5/1996 | Mihalich | 52/158 |
| 5,996,972 A | | 12/1999 | Kaiser | |
| 6,592,103 B2 | * | 7/2003 | Sennhauser | 256/12.5 |
| 7,967,532 B2 | * | 6/2011 | Schmidt et al. | 405/259.1 |

FOREIGN PATENT DOCUMENTS

| | | | | |
|---|---|---|---|---|
| CH | 677376 A5 | * | 5/1991 | E01F 7/04 |
| EP | 1911884 A | | 4/2008 | |
| EP | 1911884 A1 | * | 4/2008 | E01F 7/04 |
| GB | 435202 A | | 9/1935 | |
| GB | 551595 A | | 3/1943 | |
| GB | 602889 A | | 6/1948 | |
| JP | 7042117 A | | 2/1995 | |
| JP | 07042117 A | * | 2/1995 | E01F 7/04 |
| WO | WO9322751 A1 | | 11/1993 | |

OTHER PUBLICATIONS

Machine Translation of EP-1911884-A1 (obtained Sep. 5, 2012 from espacenet).*

Jul. 26, 2011 Search Report from European Patent Office in EP 11 00 1312, which is the priority application to this U.S. application.

* cited by examiner

ROCKFALL PROTECTION SYSTEM

CROSS-REFERENCE TO RELATED APPLICATION

This application claims priority to European Patent Application No. 11 001 312.5, filed Feb. 17, 2011, which is hereby incorporated by reference.

BACKGROUND

The present disclosure relates to a rockfall protection system.

Although there are current rockfall protection systems allowing for safely catching material falling from a mountain slope, in particular boulders and/or tree trunks, a problem with current systems is that they must be positioned relatively high up on mountain slopes to catch falling material as early as possible. This, however, increases the effort required to remove the accumulated material due to poor accessibility.

SUMMARY

An object of an embodiment of the present disclosure is to provide a rockfall protection system which on the one hand permits the absorption of high energies in the net and on the other hand allows the accumulated material to be transported out of the support area into areas of easier accessibility below said supports.

In detail, it is provided in accordance with an embodiment of the present disclosure that the lower edge of the catch net is fixed and guided, together with the lower supporting cable guiding said lower edge, away from the supports on the downhill side of the mountain slope. To permit controlled removal of the material accumulated by the catch net, the lower central cable is furthermore in accordance with the present disclosure tensioned using braking elements at the side anchors on the mountain slope. The braking elements are here fastened at one of their ends to the respective side anchor, and with their other ends using a cable loop to the central cable. Finally, the side anchor is connected via a predetermined breaking point to the central cable. If material rolling down a mountain slope is caught by the catch net, the result is first that a force acts on the predetermined breaking point of the side anchor and causes this predetermined breaking point to fail. This in turn tensions the cable loop connected to the central cable and to the braking element, which on the one hand has the effect that the associated braking element can come into action and hence the central cables can absorb the energy from the forces generated by the falling material, and on the other hand causes the catch net to give way in its lower area. This giving way in turn prevents the material caught by the catch net from entangling in the net. Instead, it is possible with this method for the material caught by the central area of the catch net to be deliberately bounced back to the mountain slope, so that it can then be removed safely below that area of the catch net laid towards the downhill side of the mountain slope as far as the lower edge of said net. The lower edge and the lower support cable are in an embodiment laid at places enabling easy removal of the material accumulated by the net.

Although it is known per se, to fix the lower area of the catch net downhill of the mountain slope away from the supports, studies conducted in connection with an embodiment of the present disclosure have shown that with a design of this type, without one or more features of embodiments of the present disclosure (e.g., without the provision of central cables in accordance with the present disclosure and without their tensioning as previously set forth using braking elements and predetermined breaking points), the accumulated material is not caught in an area close to the supports, but there is a high risk that the energy of the falling material is too high in the area of the lower support cable, hence resulting in a failure of the structure.

BRIEF DESCRIPTION OF THE DRAWINGS

Further details, features and advantages of the present disclosure can be inferred from the following description of one or more embodiments in accordance with the accompanying drawings.

DETAILED DESCRIPTION

Figure 1:
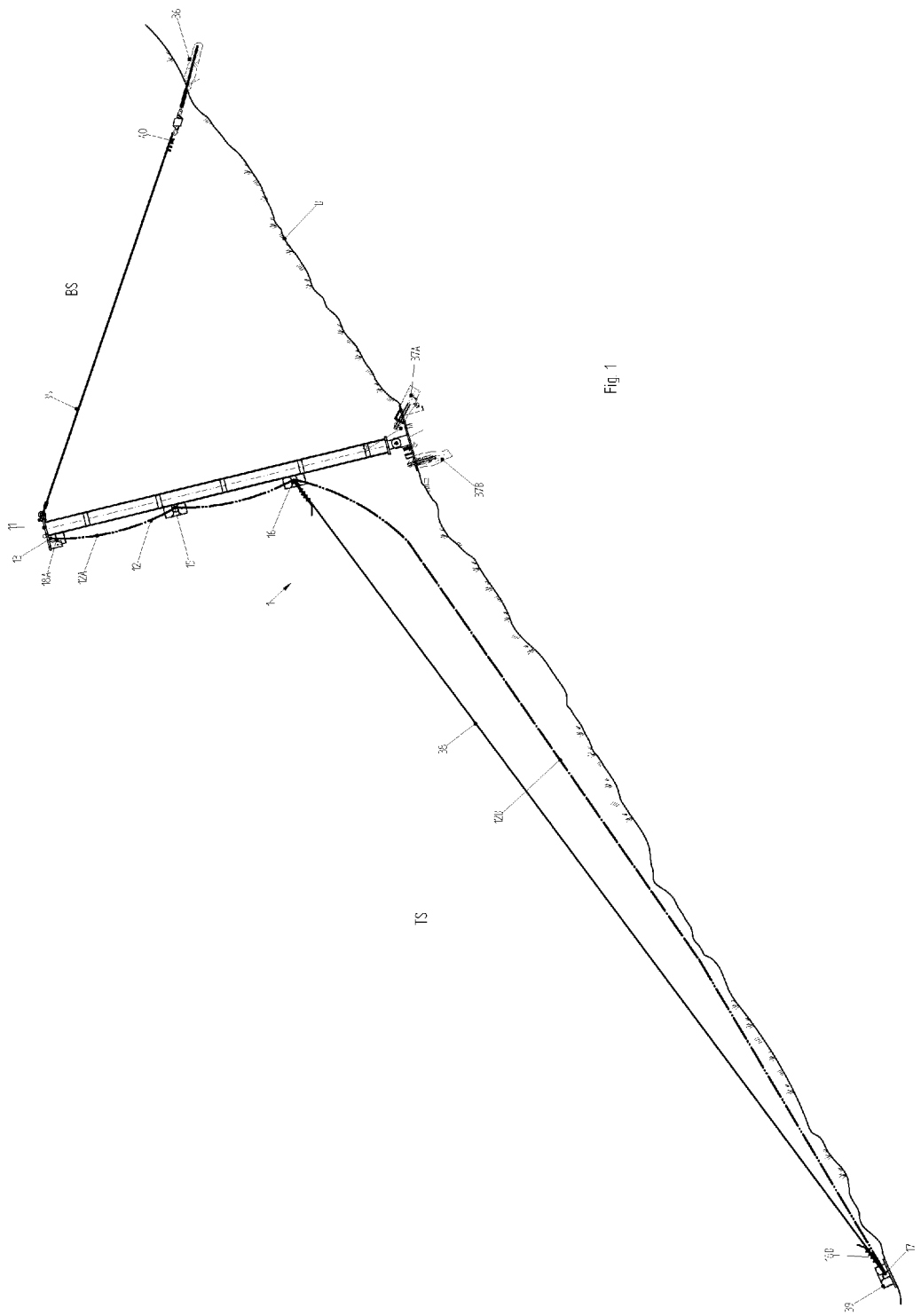
FIG. 1 shows in slightly simplified form a schematic side view of a rockfall protection system in accordance with the present disclosure.

FIG. 1 shows in schematically simplified form a rockfall protection system 1 fixed on a mountain slope B between an uphill side BS and a downhill side TS to safeguard said mountain slope.

Figure 2:
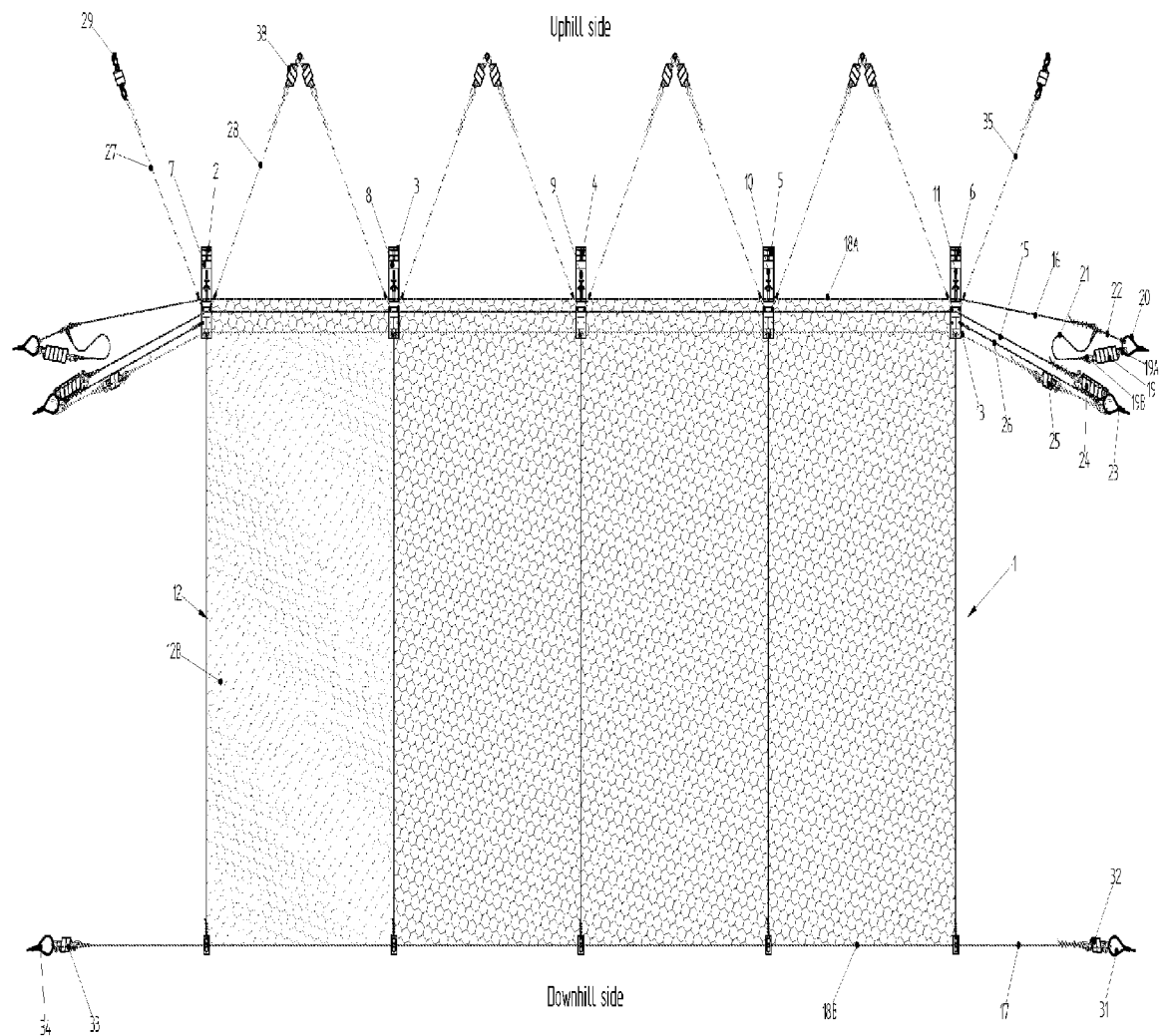
FIG. 2 is a top view of the rockfall protection system in accordance with FIG. 1.

Viewing the FIGS. 1 and 2 together shows that the rockfall protection system 1 has a catch net 12 (in some embodiments an omega net) which is divided into two catch net areas 12A and 12B. The catch net area 12A is here guided by a plurality of upright and spaced supports 2 to 6 in a central support area 14.

FIG. 1 shows a side view of the support 6 as being representative of all identically designed supports 2 to 6. The support 6 guides at its head 11 an upper support cable 13 of the catch net area 12A and also an upper central cable 15 and a lower central cable 16. Thanks to this arrangement, an upper edge 18A of the catch net area 12A is guided by the support cable 13 at the support head 11, while the upper central cable 15 and the lower central cable 16 guide the catch net area 12A in the central support area 14 of the supports 2 to 6.

The catch net area 12B laid over the downhill side TS of the mountain slope B is guided by means of a lower support cable 17 using a plurality of anchor plates fixed on the mountain slope B. As shown in the example in FIG. 2, five such anchor plates are provided, of which one is identified by the reference numeral 39 in the side view of FIG. 1.

The lower support cable 17 is here fixed on both sides using side anchors 31 and 34 on the mountain slope B, said anchors being provided with a braking element 32 and 33 respectively, with reference being made here to FIG. 2.

As is shown in FIG. 1, above the catch net area 12B a downhill bracing system 38 is arranged, which according to FIG. 2 in this preferred embodiment is formed by five bracing cables. The bracing system 38 is intended for limiting net deformation in the catch net area 12B.

As can be seen by viewing FIGS. 1 and 2 together, the supports 2 to 6 are each guided at their respective support heads 7 to 11 by two uphill retaining cables from uphill anchors. In FIG. 2, the retaining cables 27 and 28 of support 2 are identified here with their respective reference numerals representatively for all uphill retaining cables and anchors. The uphill anchors are identified by the reference numerals 29 and 30.

The side view of FIG. 1 illustrates the uphill retaining cable 35 with its associated uphill anchor 36 and a braking element

40. Since in the example five supports 2 to 6 are provided, the result is a total number of ten such uphill retaining cables with associated uphill anchors, as can be seen in detail in FIG. 2.

In a further embodiment, these uphill retaining cables can be omitted, so that the arrangement of the supports and base plates is only a rigid connection.

To complete the description of the support arrangement, it must be pointed out that the supports 2 to 6 are each mounted at their support base using a base plate 37 on the mountain slope and fixed using respective associated tension anchors 37A and compression anchors 37B. In this connection, reference is made to FIG. 1, reference numerals 37 (base plate), 37A (tension anchor) and 37B (compression anchor).

It can also be seen from FIG. 2 that the lower central cable 16 is guided at its two ends by an identically structured arrangement of side anchors, cable loops and braking elements. The same applies for the upper central cable 15, so that the embodiments described in the following and provided on the right-hand side of FIG. 2 with the corresponding reference numerals are representative of these arrangements.

In this embodiment, two central cables 15, 16 are arranged, however it is also possible to provide four or six or any number of central cables. In addition, the design can also feature central cables that have dual guidance.

Accordingly, on the mountain slope B the lower central cable 16 is tensioned using side anchors 20 provided with braking elements 19. The braking element 19 is here fixed at one of its ends 19A to the side anchor 20. At its other end 19B, the braking element 19 is connected by a cable loop 21 to the central cable 16. FIG. 2 furthermore illustrates that the side anchors 20 are each connected via a predetermined breaking point 22 to the central cable 16.

The upper central cable 15 is fixed using a lateral brace 26 and a braking element 24 on a side anchor 23, which in turn is fastened to the mountain slope B.

Due to this arrangement, it is possible to safely slow down and catch material to be retained, such as boulders coming away from the mountain slope B on the uphill side BS, using the catch net area 12A guided in the central support area 14. To ensure the accumulated material does not remain entangled in the catch net area 12A, the force exerted when the net catches it results in a failure of the predetermined breaking point 22, which tensions the cable loop 21. As a result, the braking element 19 can come into effect and the accumulated material can bounce back onto the mountain slope B due to the catch net area 12A giving way in its lower part. Then the slowed down material can be removed on the downhill side TS below the catch net area 12B as far as its lower edge 18B. In the area of the lower edge 18B, the accumulated material is finally halted and can be removed substantially more easily from the catch net 12 in this area than if the accumulated material were to become entangled in the catch net area 12A of the catch net 12.

Figure 3:
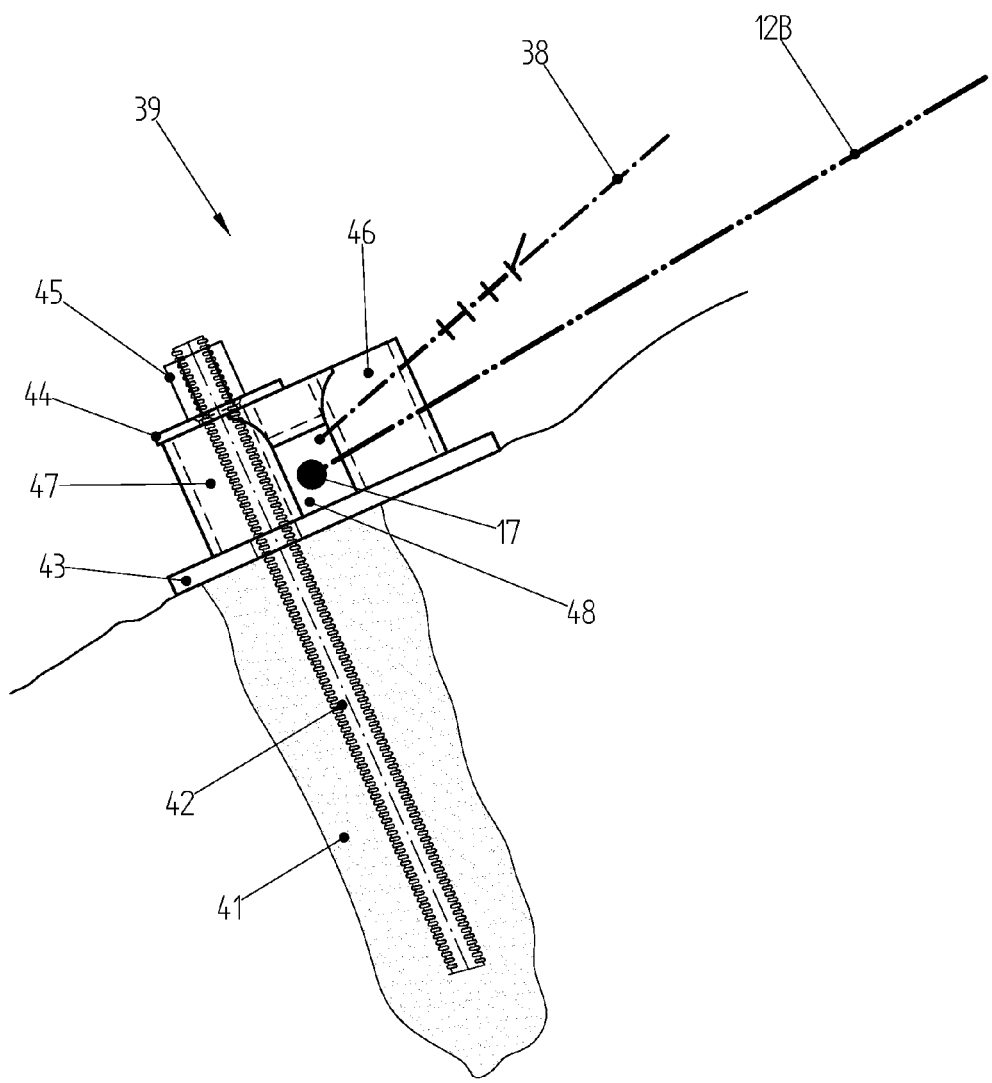
FIG. 3 is a side view of an anchor plate in accordance with the present disclosure.

The anchor 39 shown in detail in FIG. 3 is representative for the plurality of anchors visible in FIG. 2. The anchor 39 has an anchor plate 43 on which is arranged a cable guide unit 46 of cylindrical design, i.e. with rounded guide surfaces. The cable guide unit 46 limits with a pile guide 47 a recess 48 through which the lower downhill support cable 17 and the lower bracing system 38 are passed.

A micro-pile 42 is passed through the pile guide 47 and engages on the uphill side in an anchor grout 41 inserted into the mountain slope B. A shim 44 is arranged on the pile guide 47 and the micro-pile 42 is fixed by means of a screw union 45.

In addition to the written disclosure above, explicit reference is made here to its drawn representation in FIGS. 1 to 3.

It must be added that all braking elements are provided with predetermined breaking points permitting a deformation of said braking elements only after a specified load level has been exceeded. This makes replacement of deformed braking elements necessary only in the case of rockfall events with higher energies, and hence saves maintenance costs over the duration of use.

In an embodiment of the present disclosure, a rockfall protection system (1), between an uphill side (BS) and a downhill side (TS) of a mountain slope (B), may have a plurality of upright and spaced supports (2 to 6), each featuring a support head (7 to 11), a catch net (12), an upper support cable (13) guiding an upper edge (18A) of the catch net (12) at the support heads (7 to 11) of the supports (2 to 6), an upper central cable (15) and a lower central cable (16) guiding the catch net (12) in a central support area (14) of the supports (2 to 6), a lower support cable (17) guiding a lower edge (18B) of the catch net (12), with the lower support cable (17) being guided on the mountain slope (B) together with the lower edge (18B) of the catch net (12) on the downhill side of the supports (2 to 6) and separated from said supports (2 to 6), and the lower central cable (16) being tensioned on the mountain slope (B) using side anchors (20) provided with braking elements (19), with the braking element (19) being connected at one of its ends (19A) to the side anchor (20) and at its other end (19B) to the central cable (16) by a cable loop (21), and the side anchor (20) being connected to the central cable (16) via a predetermined breaking point (22).

One or more embodiments of the present disclosure may include one or more of the following concepts:

A. Rockfall protection system (1) between an uphill side (BS) and a downhill side (TS) of a mountain slope (B), having
- a plurality of upright and spaced supports (2 to 6), each featuring a support head (7 to 11),
- a catch net (12),
- an upper support cable (13) guiding an upper edge (18A) of the catch net (12) at the support heads (7 to 11) of the supports (2 to 6),
- an upper central cable (15) and a lower central cable (16) guiding the catch net (12) in a central support area (14) of the supports (2 to 6),
- a lower support cable (17) guiding a lower edge (18B) of the catch net (12), characterized in that
- the lower support cable (17) is guided on the mountain slope (B) together with the lower edge (18B) of the catch net (12) on the downhill side of the supports (2 to 6) and separated from said supports (2 to 6), and
- the lower central cable (16) is tensioned on the mountain slope (B) using side anchors (20) provided with braking elements (19),
- the braking element (19) is connected at one of its ends (19A) to the side anchor (20) and at its other end (19B) to the central cable (16) by a cable loop (21), and
- the side anchor (20) is connected to the central cable (16) via a predetermined breaking point (22).

B. Rockfall protection system (1) in accordance with Paragraph A, characterized in that the predetermined breaking point (22) is provided as a cable loop or a cable.

C. Rockfall protection system (1) in accordance with Paragraph A or B, characterized by a downhill bracing system (38).

D. Rockfall protection system (1) in accordance with any one of the Paragraphs A to C, characterized in that a downhill anchor (39) is provided with a rounded cable guide unit (46).

E. Rockfall protection system (1) in accordance with Paragraph D, characterized in that the cable guide unit (46) is designed as a cylindrical tube fixed on an anchor plate (43).
F. Rockfall protection system (1) in accordance with Paragraph D or E, characterized in that the anchor (39) furthermore features a pile guide (47).

One or more embodiments of the present disclosure may include one or more of the following features, which correspond to reference numerals in the drawings:

1 Rockfall protection system
2 to 6 Upright supports
7 to 11 Support head
12 Catch net (omega net)
12A, 12B Catch net areas
13 Upper support cable
14 Central support area
15 Upper central cable
16 Lower central cable
17 Lower downhill support cable
18A Upper edge of catch net
18B Lower edge of catch net
19 Braking element, lower central cable
19A, 19B End of braking element
20 Side anchor
21 Cable loop
22 Predetermined breaking point
23 Side anchor, upper support cable, upper central cable and lateral brace
24 Braking element, upper central cable
25 Braking element, upper support cable
26 Lateral brace
27,28 Uphill retaining cables of support head
29,30 Uphill anchor
31,34 Side anchor, lower support cable
32,33 Braking element, support cable
35 Uphill retaining cable
36 Uphill anchor
37 Base plate
37A Tension anchor
37B Compression anchor
38 Downhill bracing system
39 Downhill anchor
40 Braking element
41 Anchor grout
42 Micro-pile
43 Anchor plate
44 Shim
45 Screw union
46 Cable guide unit
47 Pile guide
48 Recess
B Mountain slope
BS Uphill side
TS Downhill side

We claim:

1. A rockfall protection system configured for positioning between an uphill side and a downhill side of a slope, comprising:
   a plurality of upright and spaced supports, each having a support head and a plurality of guides configured for holding and guiding cables,
   a catch net having an upper edge, a middle portion, and a lower edge, the catch net being configured to receive a moving rock on an uphill facing side of the catch net between the upper edge and proximate the middle portion and being configured to hold a resting rock beneath a downhill, downward facing side of the catch net between the lower edge and proximate the middle portion,
   an upper support cable guiding the upper edge of the catch net at the support heads of the supports by a first guide of each of the supports,
   an upper central cable and a lower central cable guiding the middle portion of the catch net in a central support area of the supports, the upper central cable being guided by a second guide of each of the supports, the lower central cable being guided by a third guide of each of the supports, the lower central cable being connected to, and tensioned using, one or more side anchors configured to be anchored to the ground, each side anchor being provided with a first brake system that includes a first impact-absorbing element configured to provide for braking upon stretching of the catch net due to rockfall, wherein the first brake system is connected at one of its ends to the side anchor and at its other end to the lower central cable by a cable loop, and the side anchor is connected to the lower central cable via a sacrificial element configured to provide a predetermined breaking point, wherein upon stretching of the catch net due to rockfall, the predetermined breaking point is exceeded and the sacrificial element breaks away from the side anchor and the impact-absorbing element absorbs the impact of falling rocks,
   a lower support cable guiding the lower edge of the catch net, the lower edge being spaced apart and downhill from the supports, the lower support cable being guided together with the lower edge of the catch net on a downhill side of the supports and unconnected to said supports, and
   one or more downhill anchors, proximate the lower support cable, wherein the lower support cable guides the lower edge of the catch net at the one or more downhill anchors by a guide of each of the downhill anchors.

2. The rockfall protection system of claim 1, wherein the sacrificial element is a second cable loop.

3. The rockfall protection system of claim 1, further comprising a downhill bracing system that includes one or more downhill cables extending above the downhill, downward facing side of the catch net and from a proximal end, each attached at a respective one of the supports to the third guide, downhill to a distal end proximate the lower edge of the catch net, the one or more downhill cables being tensioned for limiting deformation of the downhill, downward facing side of the catch net, wherein the distal ends of the one or more downhill cables are each attached to a respective one of the one or more downhill anchors.

4. The rockfall protection system of claim 1, wherein the sacrificial element is a cable.

5. The rockfall protection system of claim 1, wherein the first, second, and third guides each include a cylindrical tube fixed on an anchor plate.

6. The rockfall protection system of claim 5, wherein each downhill anchor also includes a recess through which the lower support cable and a bracing system both extend.

7. The rockfall protection system of claim 5, wherein each downhill anchor also includes a pile guide.

8. The rockfall protection system of claim 7, wherein the one or more downhill anchors each also include a micro-pile passed through the pile guide into an anchor grout configured for insertion into the slope.

9. The rockfall protection system of claim 8, wherein the one or more downhill anchors each also include a shim arranged on the pile guide and the micro-pile is fixed by a screw union.

10. The rockfall protection system of claim 1, wherein the lower support cable includes a side anchor having a second brake system that includes a second impact-absorbing element which is configured to provide for braking upon stretching of the catch net cable due to rockfall.

11. The rockfall protection system of claim 1, wherein each support is guided at their respective support heads by at least two uphill retaining cables from uphill anchors.

12. The rockfall protection system of claim 1, wherein each support includes a base plate on a bottom of the support, and at least one of a tension anchor and a compression anchor, proximate the base plate, configured for anchoring to the slope.

13. The rockfall protection system of claim 1, wherein the upper central cable is fixed using a lateral brace, a third brake system that includes a third impact-absorbing element which is configured to provide for braking upon stretching of the catch net due to rockfall and a side anchor configured for fastening to the slope.

14. The rockfall protection system of claim 1, wherein the upper support cable, the upper central cable and the lower central cable are each intermeshed within the catch net and each are slidably received and guided within a respective guide attached to each support in order to enable the catch net and the upper support, upper central, and lower central cables to slidably move to absorb the impact of falling rocks, such that upon a predetermined stretching of the net and the upper support, upper central, and lower central cables due to rockfall, releasable elements release a central segment of each of the respective upper support, upper central and lower central cables from a support cable segment attached to a corresponding side anchor.

15. The system of claim 1, wherein the first impact absorbing element is a coiled spring.

16. The rockfall protection system of claim 1, wherein the first impact absorbing element is a stretchable impact absorbing cable component.

17. The rockfall protection system of claim 1, wherein the first impact absorbing element is a deformable coiled component.

18. A rockfall protection system configured for positioning between an uphill side and a downhill side of a slope, comprising:
   a plurality of upright and spaced supports, each having a support head and a plurality of guides configured for holding and guiding cables,
   a catch net having an upper edge, a middle portion, and a lower edge, the catch net being configured to receive a moving rock on an uphill facing side of the catch net between the upper edge and proximate the middle portion and being configured to hold a resting rock beneath a downhill, downward facing side of the catch net between the lower edge and proximate the middle portion,
   an upper support cable guiding the upper edge of the catch net at the support heads of the supports by a first guide of each of the supports,
   an upper central cable and a lower central cable guiding the middle portion of the catch net in a central support area of the supports, the upper central cable being guided by a second guide of each of the supports, the lower central cable being guided by a third guide of each of the supports and tensioned at each end thereof using one or more side anchors configured to be anchored to the ground, each side anchor being provided with a brake that includes a stretchable impact-absorbing cable component which provides for braking upon stretching of the lower central cable due to rockfall, wherein the brake is connected at one of its ends to the side anchor and at its other end to the lower central cable by a cable loop, and the side anchor is connected to the lower central cable via a predetermined breaking point defined by a cable connection, wherein upon stretching of the lower central cable due to rockfall, the predetermined breaking point is exceeded and the lower central cable breaks away from the side anchor and the brake is stretched to absorb the impact of falling rocks,
   a lower support cable guiding the lower edge of the catch net, the lower edge being spaced apart and downhill from the supports, the lower support cable being guided together with the lower edge of the catch net on a downhill side of the supports and unconnected to said supports, and
   one or more downhill anchors, proximate the lower support cable, wherein the lower support cable guides the lower edge of the catch net at the one or more downhill anchors by a guide of each of the downhill anchors.

19. The system of claim 18, wherein the predetermined breaking point has a first position in which a force acting on the uphill facing side of the catch net is not imparted on the brake and a second position in which the force acting on the uphill facing side of the catch net is imparted on the brake.

20. The system of claim 19, wherein the predetermined breaking point is configured to fail and break from a particular force acting on the uphill facing side of the catch net thereby causing the predetermined breaking point to move from the first position to the second position.

21. The system of claim 18, wherein the predetermined breaking point is defined by a cable having a first end connected to the side anchor and a second end connected to the lower central cable.

22. The system of claim 18, wherein the stretchable impact-absorbinq cable component is a coiled component.

* * * * *